(12) United States Patent
Mizuno

(10) Patent No.: US 11,508,523 B2
(45) Date of Patent: Nov. 22, 2022

(54) MULTI-LAYER CERAMIC ELECTRONIC COMPONENT

(71) Applicant: TAIYO YUDEN CO., LTD., Tokyo (JP)

(72) Inventor: Kotaro Mizuno, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 85 days.

(21) Appl. No.: 16/864,960

(22) Filed: May 1, 2020

(65) Prior Publication Data

US 2020/0365328 A1 Nov. 19, 2020

(30) Foreign Application Priority Data

May 13, 2019 (JP) .............................. JP2019-090507

(51) Int. Cl.
*H01G 4/30* (2006.01)
*H01G 4/12* (2006.01)
*H01G 4/012* (2006.01)

(52) U.S. Cl.
CPC .............. *H01G 4/30* (2013.01); *H01G 4/012* (2013.01); *H01G 4/129* (2013.01); *H01G 4/1218* (2013.01)

(58) Field of Classification Search
CPC ............ H01G 4/12; H01G 4/30; H01G 4/012; H01G 4/1218; H01G 4/129; H01G 4/1208; H01G 4/1209
USPC ..... 361/321.1, 321.5, 301.4, 311, 321.2, 312
See application file for complete search history.

(56) References Cited

U.S. PATENT DOCUMENTS

| | | |
|---|---|---|
| 2012/0229951 A1 | 9/2012 | Kim |
| 2016/0093440 A1* | 3/2016 | Nishisaka ................ H01G 4/30 361/301.4 |
| 2017/0169952 A1* | 6/2017 | Kato ....................... H01G 4/232 |
| 2020/0051744 A1* | 2/2020 | Park ....................... H01G 4/008 |

FOREIGN PATENT DOCUMENTS

| | | | | |
|---|---|---|---|---|
| CN | 104103419 A | * | 10/2014 | ............. H01G 4/012 |
| JP | 2015029123 A | | 2/2015 | |

* cited by examiner

*Primary Examiner* — Arun Ramaswamy
(74) *Attorney, Agent, or Firm* — Law Office of Katsuhiro Arai

(57) ABSTRACT

A multi-layer ceramic electronic component includes: a ceramic body including a multi-layer unit having a side surface facing in a direction of a first axis and including internal electrodes laminated in a direction of a second axis orthogonal to the first axis and having end portions on the side surface, and a side margin including a first inner layer adjacent to the side surface and including a first region containing a glass component, a first outer layer outside of the first inner layer, and a ridge positioned at an end portion of the first outer layer in the direction of the second axis and including a second region containing a glass component at a lower concentration than a concentration of the glass component of the first region, the side margin having a dimension of 13 μm or less in the direction of the first axis; and an external electrode.

5 Claims, 13 Drawing Sheets

MULTI-LAYER CERAMIC ELECTRONIC COMPONENT

BACKGROUND ART

The present disclosure relates to a multi-layer ceramic electronic component including side margins provided in a later step.

A multi-layer ceramic capacitor includes a protective unit for protecting the circumference of internal electrodes. For miniaturization and increase in capacitance of the multi-layer ceramic capacitor, it is advantageous to thin the protective unit, which does not contribute to the formation of a capacitance, as much as possible. Japanese Patent Application Laid-open No. 2015-029123 discloses a technique capable of thinning the protective unit.

In the technique disclosed in Japanese Patent Application Laid-open No. 2015-029123, a multi-layer unit having side surfaces from which internal electrodes are exposed is produced, and side margins are provided to the side surfaces of the multi-layer unit. In this multi-layer ceramic capacitor, even if the side margins are thinned to achieve the miniaturization and increase in capacitance, the side margins can appropriately protect the side surfaces of the multi-layer unit, from which the internal electrodes are exposed.

SUMMARY OF THE INVENTION

However, in the multi-layer ceramic capacitor, as the side margins provided to the side surfaces of the multi-layer unit become thinner, cracks that occur in the side margins when an external impact is applied thereto are more likely to reach the side surfaces of the multi-layer unit. Thus, in the multi-layer ceramic capacitor, a short circuit of the internal electrodes on the side surfaces of the multi-layer unit is likely to occur due to the entry of moisture or the like.

In view of the circumstances as described above, it is desirable to provide a multi-layer ceramic electronic component capable of obtaining high impact resistance even if side margins are thinned.

Additional or separate features and advantages of the disclosure will be set forth in the descriptions that follow and in part will be apparent from the description, or may be learned by practice of the disclosure. The objectives and other advantages of the disclosure will be realized and attained by the structure particularly pointed out in the written description and claims thereof as well as the appended drawings.

To achieve these and other advantages and in accordance with the purpose of the present disclosure, as embodied and broadly described, in one aspect, the present disclosure provides a multi-layer ceramic electronic component including a ceramic body and an external electrode.

The ceramic body includes a multi-layer unit and a side margin.

The multi-layer unit has a side surface facing in a direction of a first axis and includes internal electrodes, the internal electrodes being laminated in a direction of a second axis orthogonal to the first axis and having respective end portions positioned on the side surface.

The side margin includes a first inner layer adjacent to the side surface of the multi-layer unit and including a first region containing a glass component, a first outer layer positioned outside of the first inner layer, and a ridge positioned at an end portion of the first outer layer in the direction of the second axis and including a second region containing a glass component at a lower concentration than a concentration of the glass component of the first region. The side margin has a dimension of 13 µm or less in the direction of the first axis.

The external electrode covers the ceramic body from a direction of a third axis orthogonal to the first axis and the second axis.

In this configuration, high sinterability is obtained by an action of the glass component in the first inner layer of the side margin. This can ensure high adhesiveness of the side margin to the side surface of the multi-layer unit. Meanwhile, the ridge of the side margin, which is likely to receive an external impact in the ceramic body, has a small amount of glass component and can thus suppress the progress of cracks along the crystal grain boundary. With this configuration, in the multi-layer ceramic electronic component, high impact resistance is obtained even if the side margin is thinned to have 13 µm or less.

The first outer layer of the side margin may include the second region.

In this configuration, in the entire side margin, the progress of cracks along the crystal grain boundary can be suppressed.

The multi-layer unit may further include a functional unit including the internal electrodes, and a cover that covers the functional unit from the direction of the second axis.

The cover may include a second inner layer adjacent to the functional unit and including the first region, and a second outer layer positioned outside of the second inner layer and including the second region.

In this configuration, also in the cover, the progress of cracks along the crystal grain boundary can be suppressed while ensuring high adhesiveness to the functional unit.

An entire region, of an outer surface of the ceramic body, which is not covered with the external electrode, may include the second region.

In this configuration, in the entire ceramic body, the progress of cracks along the crystal grain boundary can be suppressed.

The functional unit may include ceramic layers positioned between the internal electrodes and including the second region.

In this configuration, a decrease in function due to the glass component in the ceramic layers is less likely to occur, and thus high performance is easily obtained.

As described above, according to the present disclosure, it is possible to provide a multi-layer ceramic electronic component capable of obtaining high impact resistance even if side margins are thinned.

These and other objects, features and advantages of the present disclosure will become more apparent in light of the following detailed description of embodiments thereof, as illustrated in the accompanying drawings.

It is to be understood that both the foregoing general description and the following detailed description are exemplary and explanatory, and are intended to provide further explanation of the disclosure as claimed.

DETAILED DESCRIPTION OF THE EMBODIMENTS

Hereinafter, an embodiment of the present disclosure will be described with reference to the drawings.

In the figures, an X axis, a Y axis, and a Z axis orthogonal to one another are shown as appropriate. The X axis, the Y axis, and the Z axis are common in all figures.

1. Configuration of Multi-layer Ceramic Capacitor 10

1.1 Overall Configuration

Figure 1:
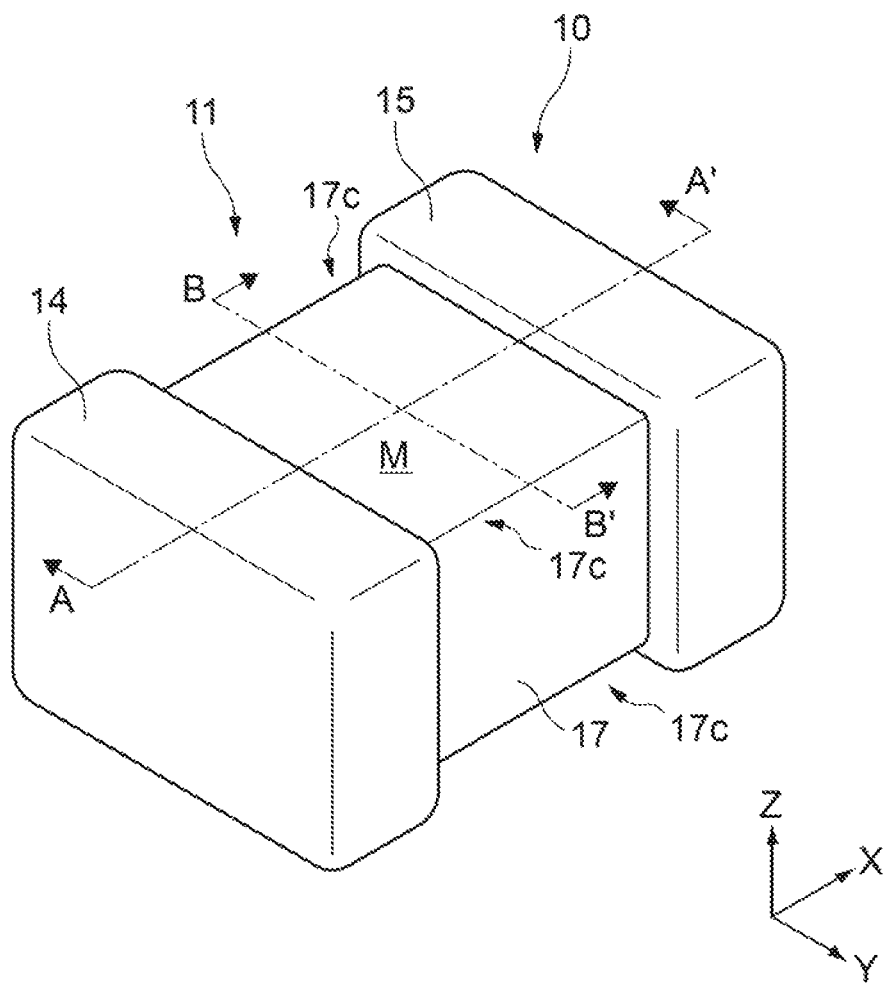
FIG. 1 is a perspective view of a multi-layer ceramic capacitor according to an embodiment of the present disclosure.
Figure 2:
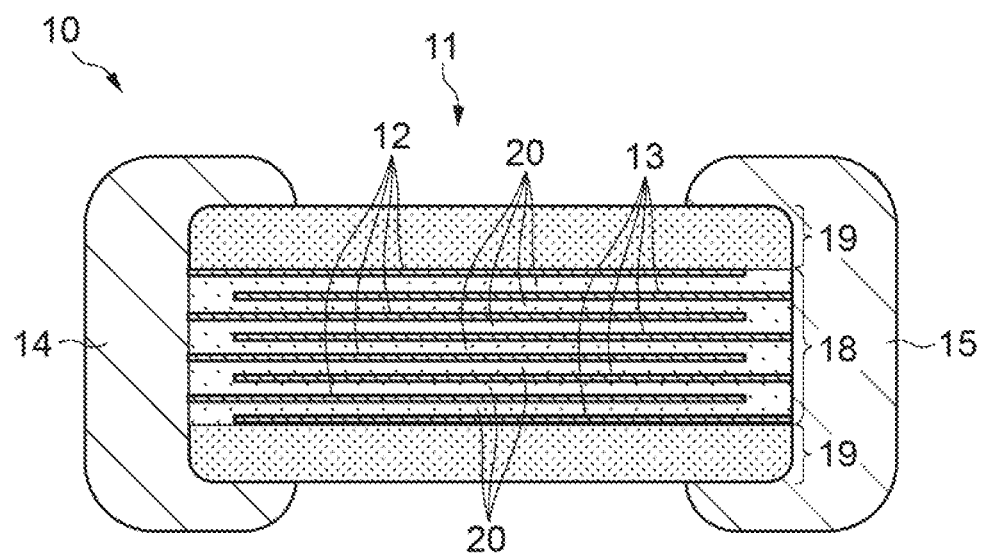
FIG. 2 is a cross-sectional view of the multi-layer ceramic capacitor taken along the A-A' line in FIG. 1.
Figure 3:
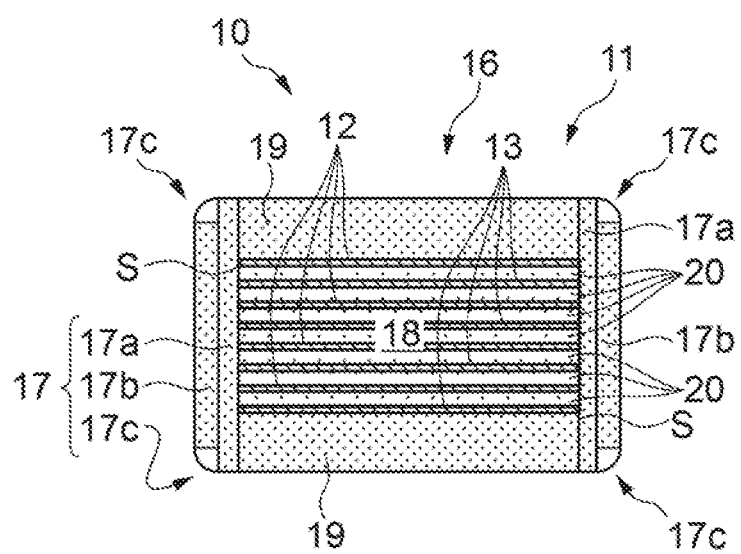
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. The ceramic body 11 is configured as a hexahedron having a pair of end surfaces facing in the X-axis direction, a pair of side surfaces facing in the Y-axis direction, and a pair of main surfaces facing in the Z-axis direction.

The first external electrode 14 and the second external electrode 15 cover both the end surfaces of the ceramic body 11 and face each other in the X-axis direction while sandwiching the ceramic body 11 therebetween. The first external electrode 14 and the second external electrode 15 extend to the main surfaces and the side surfaces from the end surfaces of the ceramic body 11. With this configuration, the first external electrode 14 and the second external electrode 15 have U-shaped cross sections parallel to the X-Z plane and the X-Y plane.

It should be noted that the shapes of the first and second external electrodes 14 and 15 are not limited to those shown in FIG. 1. For example, the first and second external electrodes 14 and 15 may extend to one of the main surfaces from both the end surfaces of the ceramic body 11 and have L-shaped cross sections parallel to the X-Z plane. This configuration allows the thickness of the multi-layer ceramic capacitor 10 along the Z-axis direction to be kept small.

The first and second external electrodes 14 and 15 are each formed of a good conductor of electricity. Examples of the good conductor of electricity forming the first and second external electrodes 14 and 15 include a metal mainly containing copper (Cu), nickel (Ni), tin (Sn), palladium (Pd), platinum (Pt), silver (Ag), gold (Au), or the like or an alloy of them.

The ceramic body 11 is formed of dielectric ceramics and includes a multi-layer unit 16 and side margins 17. The multi-layer unit 16 has a pair of side surfaces S that face in the Y-axis direction. Further, the multi-layer unit 16 has a pair of end surfaces that partially constitute the end surfaces of the ceramic body 11, and a pair of main surfaces that partially constitute the main surfaces of the ceramic body 11.

The multi-layer unit 16 has a configuration in which a plurality of sheet-like ceramic layers 20 extending along the X-Y plane are laminated in the Z-axis direction. The multi-layer unit 16 includes a capacitance forming unit 18 and a pair of covers 19. The capacitance forming unit 18 is configured as a functional unit having the function of forming a capacitance. The pair of covers 19 covers the capacitance forming unit 18 from above and below in the Z-axis direction. The pair of covers 19 constitutes the pair of main surfaces of the multi-layer unit 16.

The capacitance forming unit 18 includes first internal electrodes 12 and second internal electrodes 13. The first and second internal electrodes 12 and 13 each have a sheet-like shape extending along the X-Y plane and are laminated along the Z-axis direction. The first and second internal electrodes 12 and 13 are alternately disposed along the Z-axis direction between the ceramic layers 20. In other words, the first internal electrode 12 and the second internal electrode 13 that are adjacent to each other face each other in the Z-axis direction while sandwiching the ceramic layer 20 therebetween.

The first internal electrodes 12 are drawn to the end surface covered with the first external electrode 14. Meanwhile, the second internal electrodes 13 are drawn to the end surface covered with the second external electrode 15. With this configuration, the first internal electrodes 12 are connected to only the first external electrode 14, and the second internal electrodes 13 are connected to only the second external electrode 15.

The first and second internal electrodes 12 and 13 are formed over the entire width of the capacitance forming unit 18 in the Y-axis direction. In other words, both end portions of the first and second internal electrodes 12 and 13 in the Y-axis direction are positioned on the pair of side surfaces S of the multi-layer unit 16. With this configuration, in the ceramic body 11, the positions of both the end portions of the first and second internal electrodes 12 and 13 in the Y-axis direction are aligned within the range of 0.5 μm in the Y-axis direction.

A pair of side margins 17 cover the pair of side surfaces S of the multi-layer unit 16, from which both the end portions of the first and second internal electrodes 12 and 13 are exposed. With this configuration, the multi-layer ceramic capacitor 10 can ensure insulation properties between the first internal electrodes 12 and the second internal electrodes 13 on the pair of side surfaces S of the multi-layer unit 16 covered with the side margins 17.

In the multi-layer ceramic capacitor 10, the side margin 17, which does not contribute to the formation of a capacitance, is formed to have a small thickness as the dimension in the Y-axis direction. This is advantageous to a large capacitance and miniaturization of the multi-layer ceramic capacitor 10. Specifically, in the multi-layer ceramic capacitor 10, the side margin 17 has a thickness of 13 µm or less.

With such a configuration, when a voltage is applied between the first external electrode 14 and the second external electrode 15 in the multi-layer ceramic capacitor 10, the voltage is applied to the ceramic layers 20 between the first internal electrodes 12 and the second internal electrodes 13. This allows the multi-layer ceramic capacitor 10 to store charge corresponding to the voltage applied between the first external electrode 14 and the second external electrode 15.

In the ceramic body 11, in order to increase capacitances of the respective ceramic layers 20 provided between the first internal electrodes 12 and the second internal electrodes 13, dielectric ceramics having a high dielectric constant is used. Examples of the dielectric ceramics having a high dielectric constant include a material having a Perovskite structure containing barium (Ba) and titanium (Ti), which is typified by barium titanate ($BaTiO_3$).

It should be noted that the ceramic layer 20 may have a composition based on strontium titanate ($SrTiO_3$), calcium titanate ($CaTiO_3$), magnesium titanate ($MgTiO_3$), calcium zirconate ($CaZrO_3$), calcium zirconate titanate ($Ca(Zr,Ti)O_3$), barium zirconate ($BaZrO_3$), titanium oxide ($TiO_2$), or the like.

The first and second internal electrodes 12 and 13 are each formed of a good conductor of electricity. Examples of the good conductor of electricity forming the first and second internal electrodes 12 and 13 typically include nickel (Ni), and other than nickel (Ni), include a metal mainly containing copper (Cu), palladium (Pd), platinum (Pt), silver (Ag), gold (Au), or the like or an alloy of them.

1.2 Detailed Configuration of Ceramic Body 11

1.2.1 Description of Outline

The ceramic body 11 includes a first region and a second region that have microstructures different from each other. Specifically, the first region has a microstructure, which contains a glass component and includes a glass phase deposited in a crystal grain boundary that is a boundary portion of crystal grains. The second region has a microstructure, which has a lower concentration of the glass component than that of the first region and in which the glass phase is not substantially deposited in the crystal grain boundary.

The glass component included in the first region only needs to be a component that has a low melting point and forms a liquid phase at the sintering of the ceramic body 11. Such a glass component includes, for example, silicon and boron. In the first region, a liquid phase including the glass component is discharged from the crystal grains at the sintering, and the glass phase becomes a microstructure resulting from the segregation of the glass phase in the crystal grain boundary.

In the first region, the presence of the glass phase having a low dielectric constant makes it difficult to obtain a large capacitance. Meanwhile, in the second region, a reduction in capacitance due to the influence of the glass phase does not occur, which makes it easy to obtain a large capacitance. For that reason, in the multi-layer ceramic capacitor 10, it is favorable that the plurality of ceramic layers 20 constituting the capacitance forming unit 18 constitutes the second region.

Further, in the first region in which the glass phase is deposited in the crystal grain boundary, high sinterability is obtained by the generation of the liquid phase at the sintering. Meanwhile, in the first region in which the glass phase has a low mechanical strength, a brittle fracture is likely to occur in the crystal grain boundary. In other words, in the first region, cracks are likely to occur in the crystal grain boundary, and the generated cracks are likely to progress along the crystal grain boundary.

To the contrary, in the second region in which the glass phase is not substantially deposited in the crystal grain boundary, the mechanical strength in the crystal grain boundary is high, and thus cracks are less likely to occur in the crystal grain boundary and less likely to progress along the crystal grain boundary. Meanwhile, in the second region, since the liquid phase is not substantially generated at the sintering of the ceramic body 11, high sinterability is less likely to be obtained.

In the ceramic body 11, the arrangement of the first region and the second region is determined such that the circumference of the capacitance forming unit 18 can be appropriately protected and high impact resistance can be achieved. Hereinafter, as examples of the arrangement of the first region and the second region in the ceramic body 11, a configuration example 1 shown in FIG. 3, a configuration example 2 shown in FIG. 4, and a configuration example 3 shown in FIG. 5 will be described.

1.2.2 Configuration Example 1

In the configuration example 1 of the ceramic body 11 shown in FIG. 3, each side margin 17 includes a first inner layer 17a and a first outer layer 17b. The first inner layer 17a is adjacent to the side surface S of the multi-layer unit 16 and constitutes a bonding surface for the side surface S of the multi-layer unit 16.

The first outer layer 17b is positioned outside of the first inner layer 17a in the Y-axis direction and constitutes the side surface of the ceramic body 11.

Each first outer layer 17b includes a pair of ridges 17c that extend along the X-axis direction at both the end portions in the Z-axis direction. The ridges 17c have a shape bulging outward and are also exposed to the outside at the central regions in the X-axis direction without being covered with the first and second external electrodes 14 and 15. Thus, the ceramic body 11 is likely to receive a strong impact, particularly from the outside, at the ridges 17c.

In each figure, the first region is shown in a dense dot pattern, and the second region is shown in a rough dot pattern. As shown in FIG. 3, in each of the side margins 17 according to the configuration example 1, only the ridges 17c constitute the second regions, and the first inner layer 17a and a portion of the first outer layer 17b excluding the ridges 17c constitute the first regions. Further, the covers 19 according to the configuration example 1 constitute the first regions.

In the first inner layers 17a and the covers 19, which constitute the first regions, high sinterability is obtained.

Thus, in the ceramic body 11, high adhesiveness of the first inner layers 17a and the covers 19 to the capacitance forming unit 18 can be ensured. Therefore, in the ceramic body 11, the circumference of the capacitance forming unit 18 is appropriately protected, and the performance such as moisture resistance is likely to be maintained.

Further, at the ridges 17c, which constitute the second regions, the mechanical strength in the crystal grain boundary is high, and thus cracks are less likely to occur in the crystal grain boundary even if an external impact is received, and cracks are less likely to progress along the crystal grain boundary. Thus, in the ceramic body 11 according to the configuration example 1, the occurrence of cracks that reach the first and second internal electrodes 12 and 13 from the surfaces of the ridges 17c can be suppressed also in the configuration including the thin side margins 17.

1.2.3 Configuration Example 2

Figure 4:
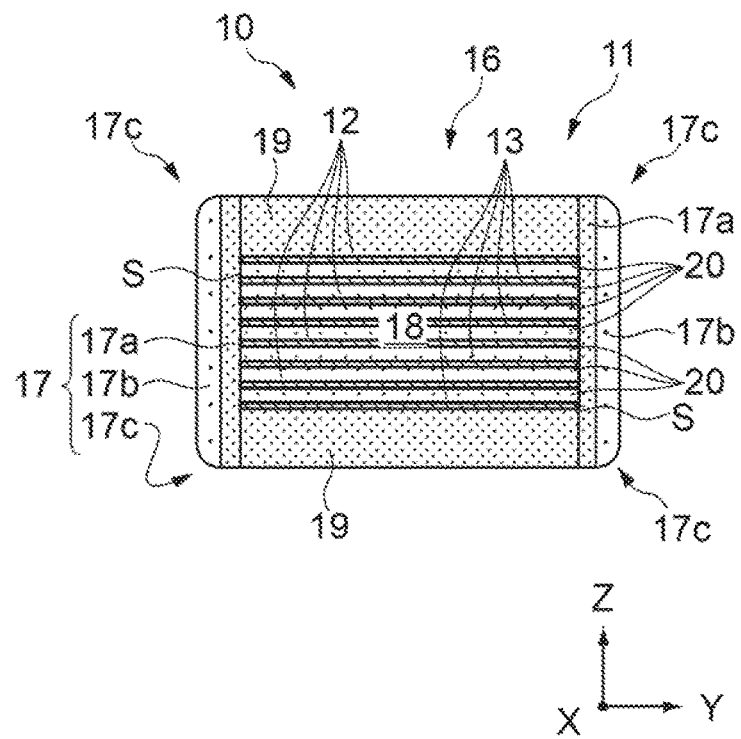
FIG. 4 is a cross-sectional view of another configuration example of the multi-layer ceramic capacitor.

In the configuration example 2 of the ceramic body 11 shown in FIG. 4, the configuration of the first outer layer 17b of the side margin 17 is different from the configuration example 1 and is common to the configuration example 1 in the other configurations. Specifically, in the side margin 17 according to the configuration example 2, the whole of the first outer layer 17b including the ridges 17c is configured as the second region.

In the ceramic body 11 according to the configuration example 2, the mechanical strength of the crystal grain boundary is high in the whole of the first outer layer 17b constituting the side surface. Thus, in the ceramic body 11 according to the configuration example 2, the occurrence of cracks that reach the first and second internal electrodes 12 and 13 from the surfaces, which are the second regions, can be suppressed also in the configuration including the thin side margins 17.

1.2.4 Configuration Example 3

Figure 5:
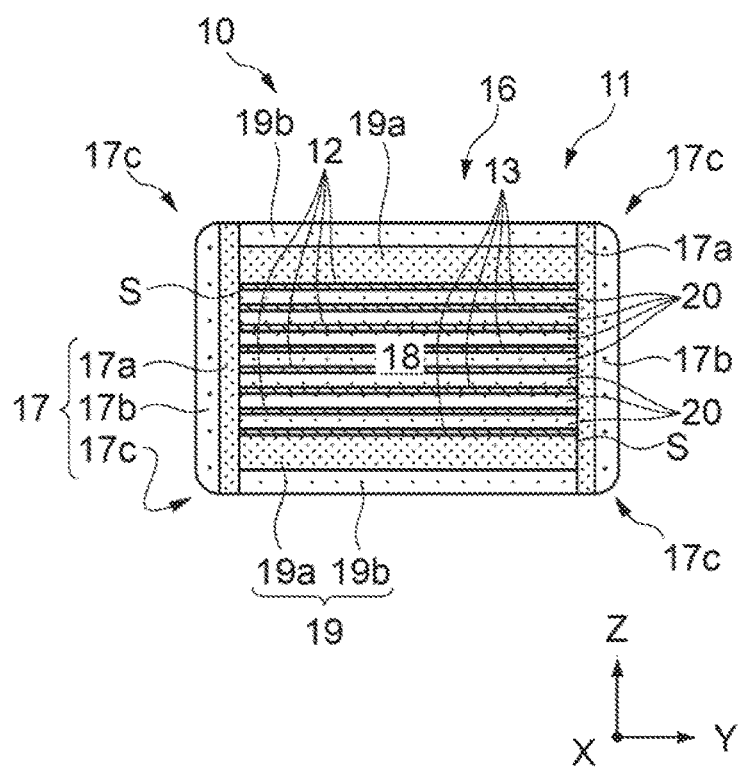
FIG. 5 is a cross-sectional view of another configuration example of the multi-layer ceramic capacitor.

In the configuration example 3 of the ceramic body 11 shown in FIG. 5, the configuration of the covers 19 is different from the configuration example 2 and is common to the configuration example 2 in the other configurations. Each of the covers 19 according to the configuration example 3 includes a second inner layer 19a and a second outer layer 19b. The second inner layer 19a is adjacent to the capacitance forming unit 18. The second outer layer 19b is positioned outside of the second inner layer 19a in the Z-axis direction and constitutes the main surface of the ceramic body 11.

In the cover 19 according to the configuration example 3, the second inner layer 19a constitutes the first region, and the second outer layer 19b constitutes the second region. In the ceramic body 11 according to the configuration example 3, the mechanical strength of the crystal grain boundary is high in the second outer layer 19b that constitutes the main surface, and thus the occurrence of cracks that reach the first and second internal electrodes 12 and 13 from the main surface can be suppressed.

2. Production Method for Multi-layer Ceramic Capacitor 10

2.1 Production Method 1

2.1.1 Description of General Outline

Figure 6:
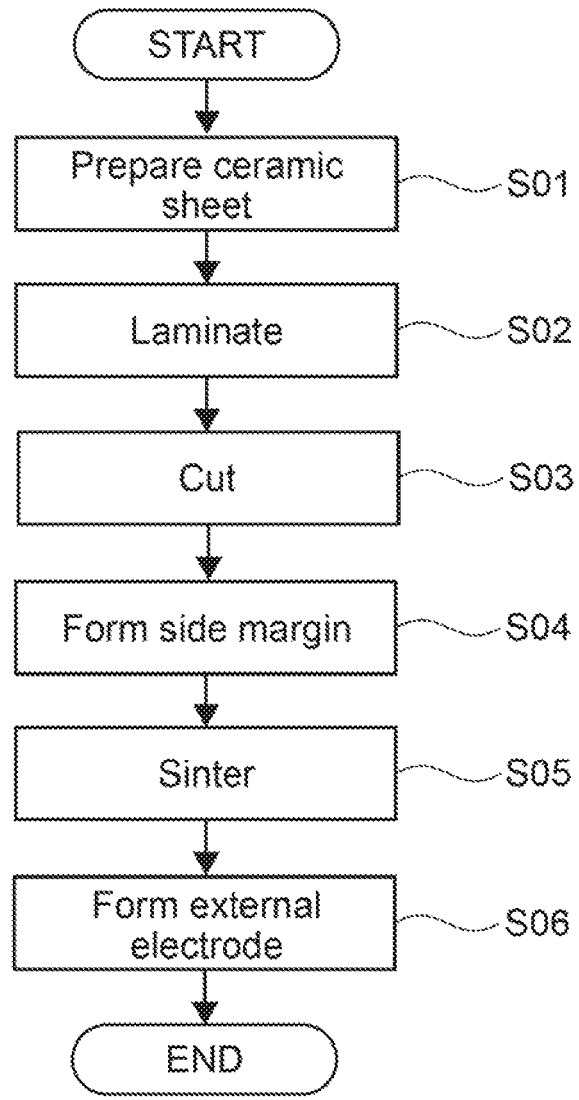
FIG. 6 is a flowchart showing a production method 1 for the multi-layer ceramic capacitor.
Figure 7:
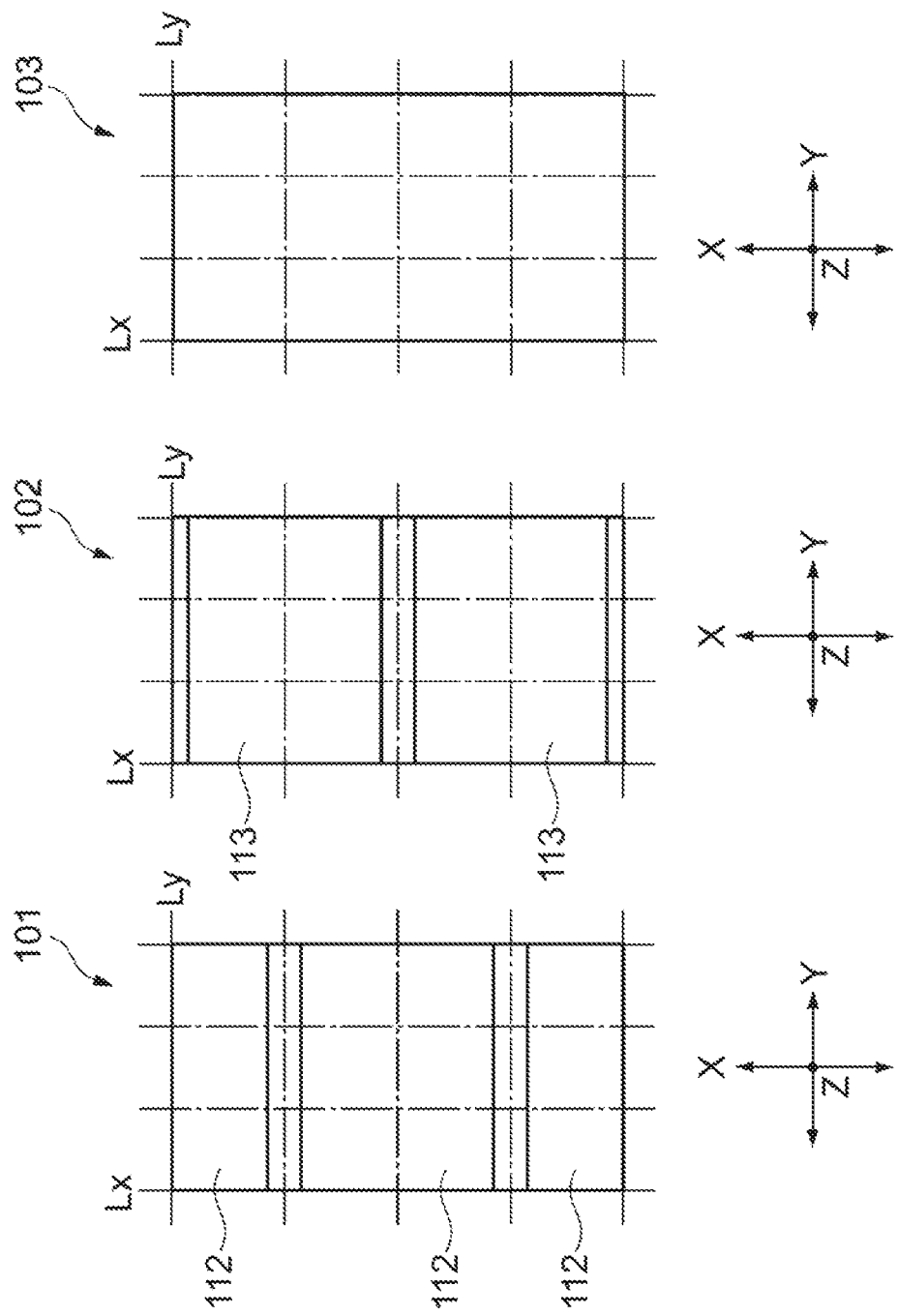
FIGS. 7A, 7B, and 7C are plan views of ceramic sheets, which are prepared in the process of preparing ceramic sheets in the production method 1.

FIG. 6 is a flowchart showing a production method 1 for the multi-layer ceramic capacitor 10 according to this embodiment. FIGS. 7A to 14B are views each showing a production process for the multi-layer ceramic capacitor 10. Hereinafter, the production method 1 for the multi-layer ceramic capacitor 10 will be described along FIG. 6 with reference to FIGS. 7A to 14B as appropriate.

2.1.2 Step S01: Preparation of Ceramic Sheet

In Step S01, first ceramic sheets 101 and second ceramic sheets 102 for forming the capacitance forming unit 18, and third ceramic sheets 103 for forming the covers 19 are prepared. The first, second, and third ceramic sheets 101, 102, and 103 are configured as unsintered dielectric green sheets mainly containing dielectric ceramics.

The first, second, and third ceramic sheets 101, 102, and 103 are each formed into a sheet shape by using a roll coater or a doctor blade, for example. The thickness of each of the first and second ceramic sheets 101 and 102 is adjusted in accordance with the thickness of the ceramic layer of the sintered capacitance forming unit 18. The thickness of the third ceramic sheet 103 is adjustable as appropriate.

Further, a glass component is added to the third ceramic sheet 103, which forms the cover 19 to constitute the first region. Meanwhile, a glass component is not added to the first and second ceramic sheets 101 and 102, which form the ceramic layers 20 of the capacitance forming unit 18 to constitute the second region.

FIGS. 7A, 7B, and 7C are plan views of the first, second, and third ceramic sheets 101, 102, and 103, respectively. At this stage, the first, second, and third ceramic sheets 101, 102, and 103 are each configured as a large-sized sheet that is not singulated. FIGS. 7A, 7B, and 7C each show cutting lines Lx and Ly used when the sheets are singulated into the multi-layer ceramic capacitors 10. The cutting lines Lx are parallel to the X axis, and the cutting lines Ly are parallel to the Y axis.

As shown in FIGS. 7A, 7B, and 7C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheet 103 corresponding to the cover 19.

The first internal electrodes 112 and the second internal electrodes 113 can be formed by applying an optional electrically conductive paste to the first ceramic sheets 101 and the second ceramic sheets 102, respectively. The method of applying the electrically conductive paste is optionally selectable from publicly known techniques. For example, for the application of the electrically conductive paste, a screen printing method or a gravure printing method can be used.

In the first and second internal electrodes 112 and 113, gaps are formed in the X-axis direction along the cutting lines Ly for every other cutting line Ly. The gaps between the first internal electrodes 112 and the gaps between the second internal electrodes 113 are alternately disposed in the X-axis direction. In other words, a cutting line Ly passing through a gap between the first internal electrodes 112 and a cutting line Ly passing through a gap between the second internal electrodes 113 are alternately disposed.

Furthermore, in Step S01, fourth ceramic sheets 104a and fifth ceramic sheets 104b (see FIGS. 12A to 14B) for forming the side margins 17 are also prepared in the manner similar to the above. A glass component is added to the fourth ceramic sheets 104a but not added to the fifth ceramic sheets 104b.

2.1.3 Step S02: Lamination

Figure 8:
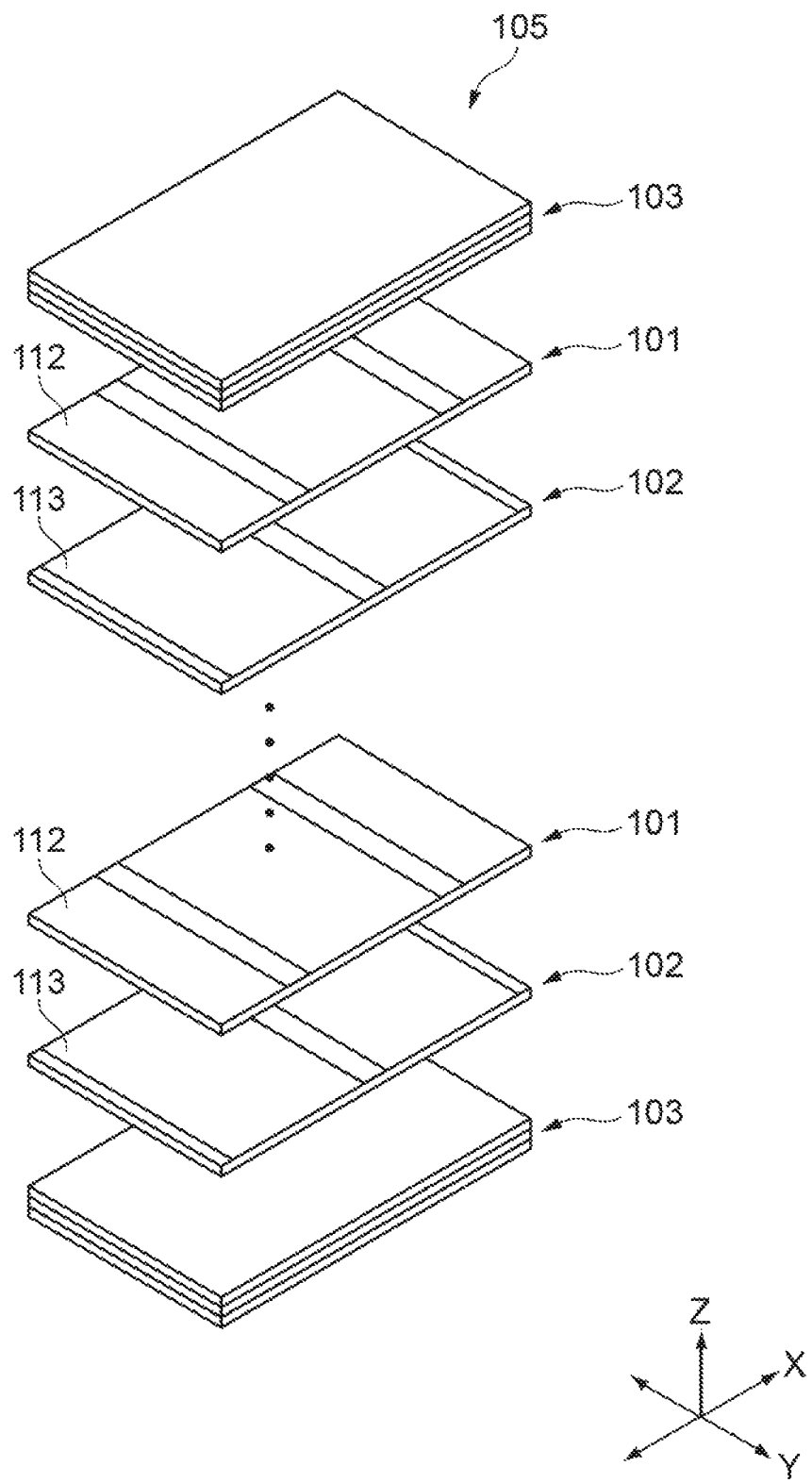
FIG. 8 is a perspective view showing a lamination process in the production method 1.

In Step S02, the first, second, and third ceramic sheets 101, 102, and 103 prepared in Step S01 are laminated as shown in FIG. 8, to produce a multi-layer sheet 105. In the multi-layer sheet 105, the first ceramic sheets 101 and the second ceramic sheets 102 that correspond to the capacitance forming unit 18 are alternately laminated in the Z-axis direction.

Further, in the multi-layer sheet 105, the third ceramic sheets 103 corresponding to the covers 19 are laminated on the upper and lower surfaces of the alternately laminated first and second ceramic sheets 101 and 102 in the Z-axis direction. The number of first, second, and third ceramic sheets 101, 102, and 103 to be laminated can be determined in accordance with the configuration of the multi-layer ceramic capacitor 10.

The multi-layer sheet 105 is integrated by pressure-bonding the first, second, and third ceramic sheets 101, 102, and 103. For the pressure-bonding of the first, second, and third ceramic sheets 101, 102, and 103, for example, hydrostatic pressing or uniaxial pressing is favorably used. This makes it possible to obtain a high-density multi-layer sheet 105.

2.1.4 Step S03: Cutting

In Step S03, the multi-layer sheet 105 obtained in Step S02 is cut along the cutting lines Lx and Ly, to produce unsintered multi-layer units 116. Each of the multi-layer units 116 corresponds to a multi-layer unit 16 to be obtained after sintering. The multi-layer sheet 105 can be cut with a push-cutting blade, a rotary blade, or the like.

Figure 9:
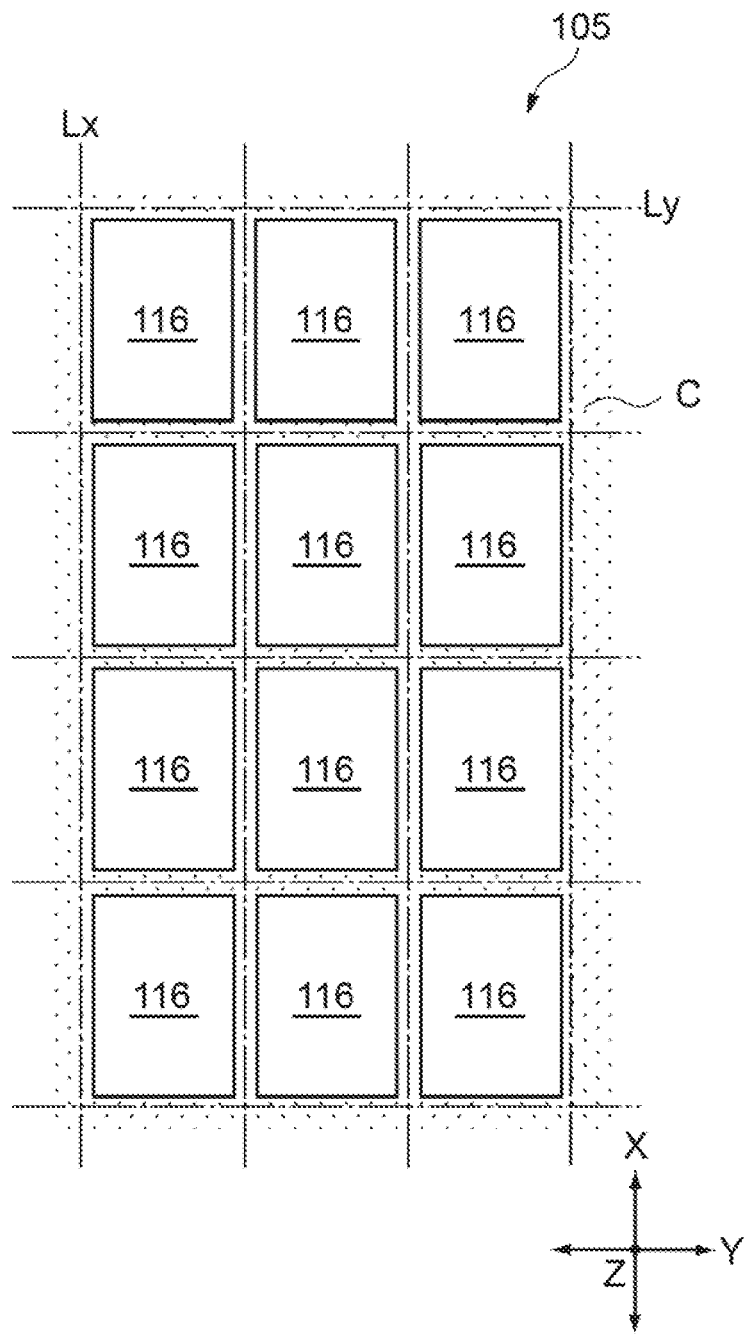
FIG. 9 is a plan view showing a cutting process in the production method 1.

FIG. 9 is a plan view of the multi-layer sheet 105 after Step S03. The multi-layer sheet 105 is cut along the cutting lines Lx and Ly while the multi-layer sheet 105 is held by an adhesive sheet C such as a foamed release sheet. The multi-layer sheet 105 is cut into pieces in such a manner, and thus the multi-layer units 116 are obtained.

Figure 10:
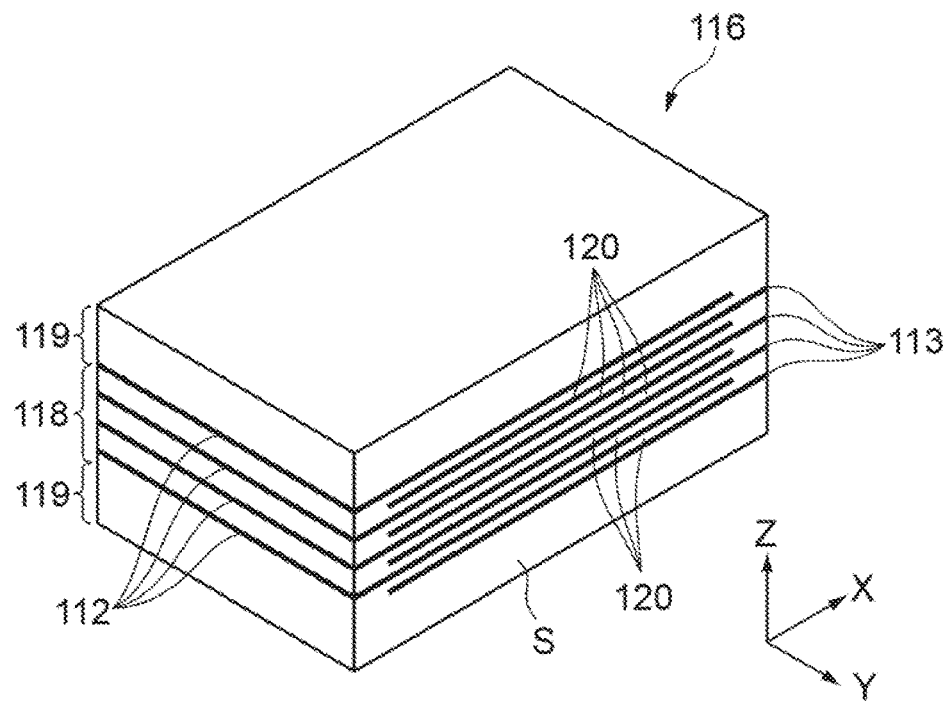
FIG. 10 is a perspective view of a multi-layer unit obtained in the cutting process in the production method 1.

FIG. 10 is a perspective view of the unsintered multi-layer unit 116 obtained in Step S03. The multi-layer unit 116 includes an unsintered capacitance forming unit 118 and unsintered covers 119. Further, in the multi-layer unit 116, the first and second internal electrodes 112 and 113 are exposed from the cut surfaces, i.e., the side surfaces S, and the end portions of the first and second internal electrodes 112 and 113 in the Y-axis direction are aligned with one another on the side surfaces S.

2.1.5 Step S04: Formation of Side Margin

Figure 11:
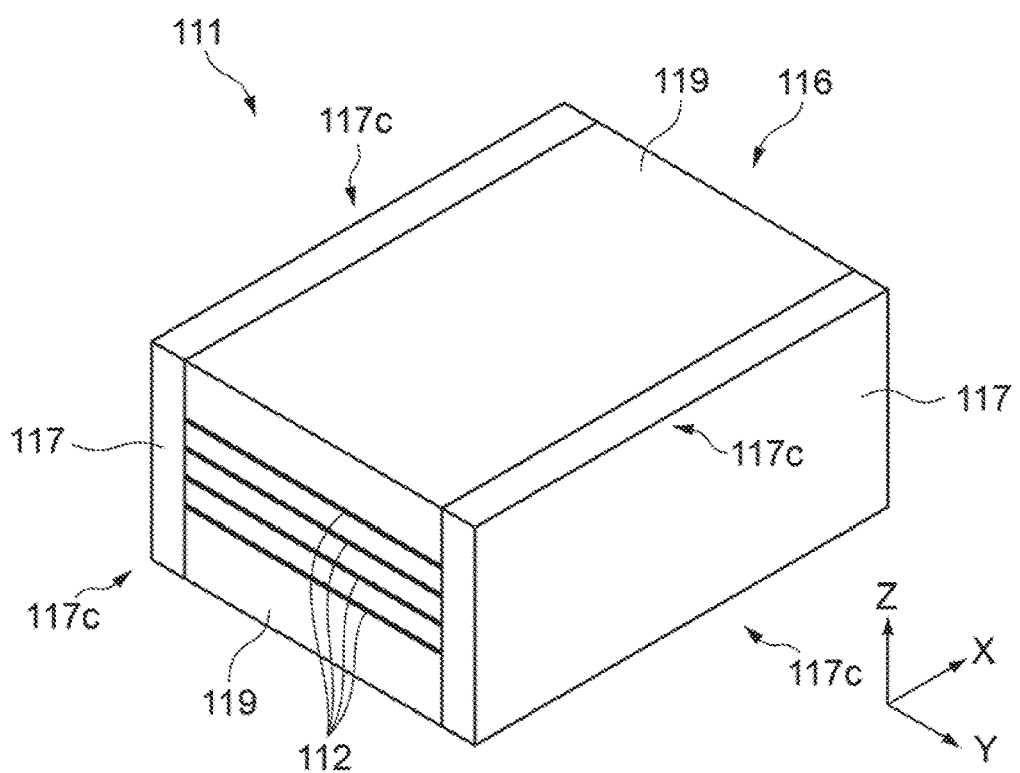
FIG. 11 is a perspective view of a ceramic body obtained in the process of forming side margins in the production method 1.

In Step S04, unsintered side margins 117 are provided to both the side surfaces S of the multi-layer unit 116 obtained in Step S03. With this configuration, an unsintered ceramic body 111 shown in FIG. 11 is obtained. In order to form the side margins 117, the fourth and fifth ceramic sheets 104a and 104b prepared in Step S01 are used.

In Step S04, a portion to be the first region in the side margin 17 is formed of the fourth ceramic sheet 104a, and a portion to be the second region in the side margin 17 is formed of the fifth ceramic sheet 104b. FIGS. 12A to 14B are cross-sectional views showing Step S04 corresponding to the configuration examples 1 to 3 shown in FIGS. 3 to 5, respectively.

Figure 12A:
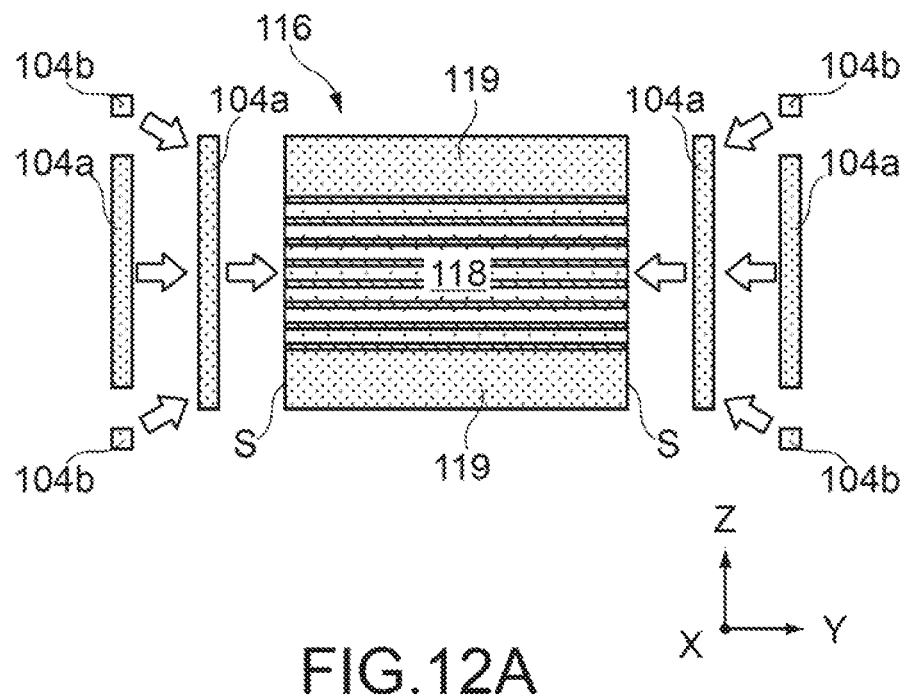
FIGS. 12A and 12B are cross-sectional views showing the process of forming side margins in the production method 1.

In the configuration example 1, as shown in FIG. 12A, the fourth ceramic sheets 104a corresponding to the first inner layers 17a are attached to the side surfaces S of the multi-layer unit 116, and thereto, the fourth ceramic sheets 104a corresponding to portions of the first outer layers 17b excluding the ridges 17c, and the fifth ceramic sheets 104b corresponding to the ridges 17c are attached.

Figure 12B:
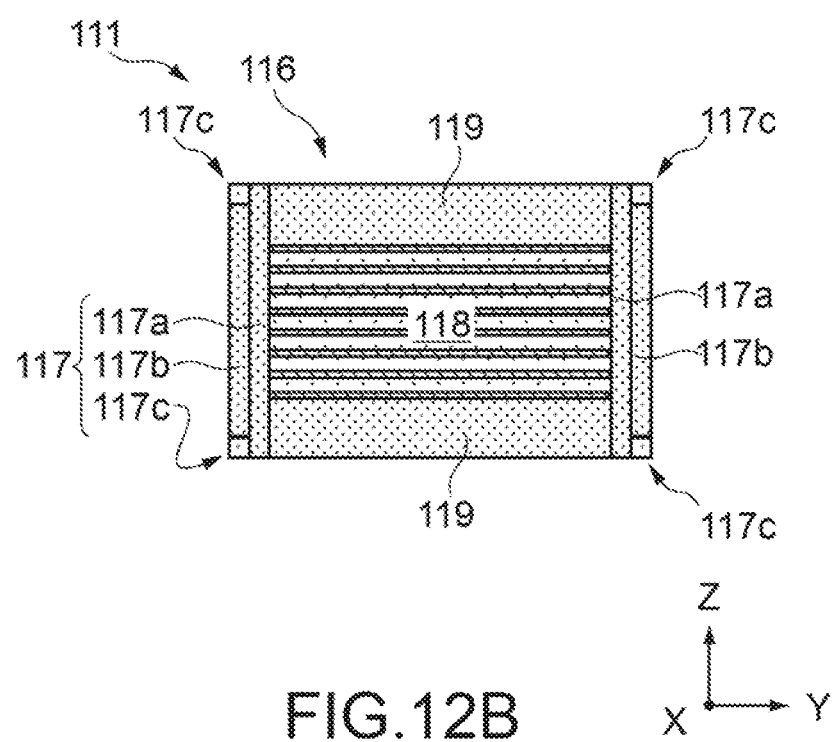

With this configuration, an unsintered ceramic body 111 according to the configuration example 1 shown in FIG. 12B is obtained. In the unsintered ceramic body 111 according to the configuration example 1, unsintered side margins 117 each including a first inner layer 117a, a first outer layer 117b, and ridges 117c, which cover the side surface S of the unsintered multi-layer unit 116, are formed.

Figure 13A:
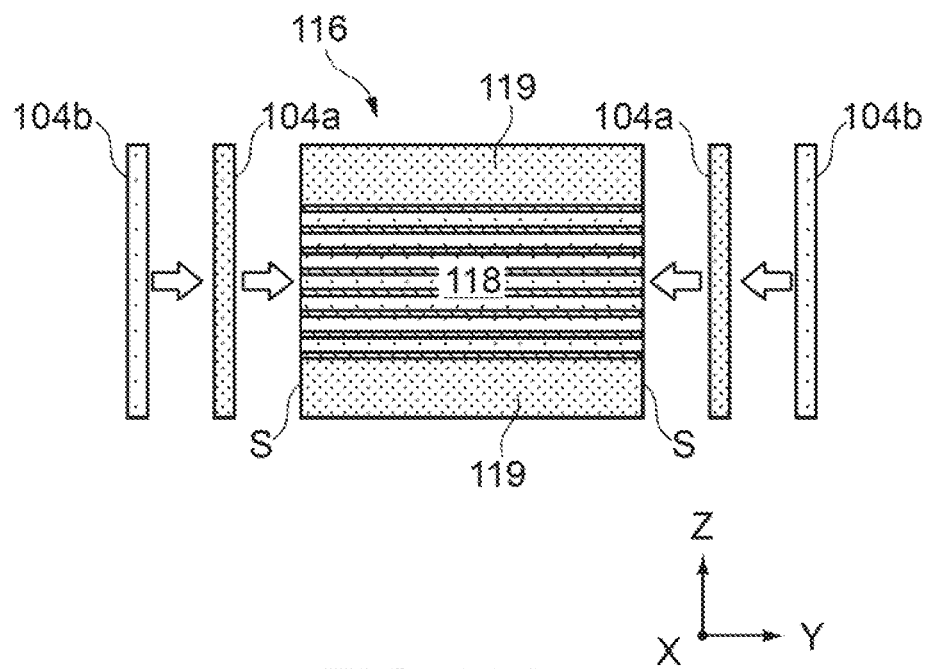
FIGS. 13A and 13B are cross-sectional views showing an another configuration example of the process of forming side margins in the production method 1.
Figure 13B:
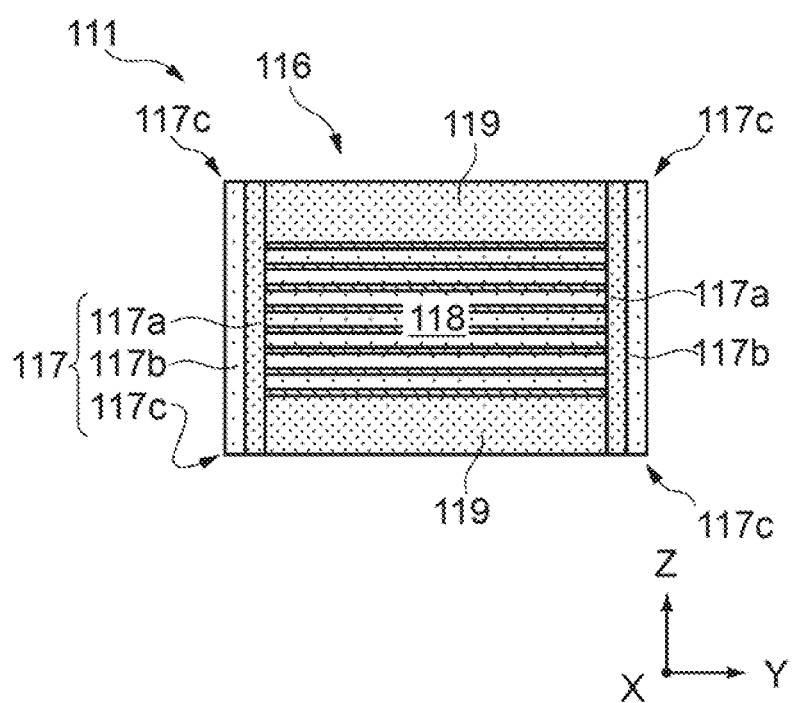

In the configuration example 2, as shown in FIG. 13A, the fourth ceramic sheets 104a corresponding to the first inner layers 17a are attached to the side surfaces S of the multi-layer unit 116, and thereto, the fifth ceramic sheets 104b corresponding to the first outer layers 17b including the ridges 17c are attached. With this configuration, an unsintered ceramic body 111 according to the configuration example 2 shown in FIG. 13B is obtained.

Figure 14A:
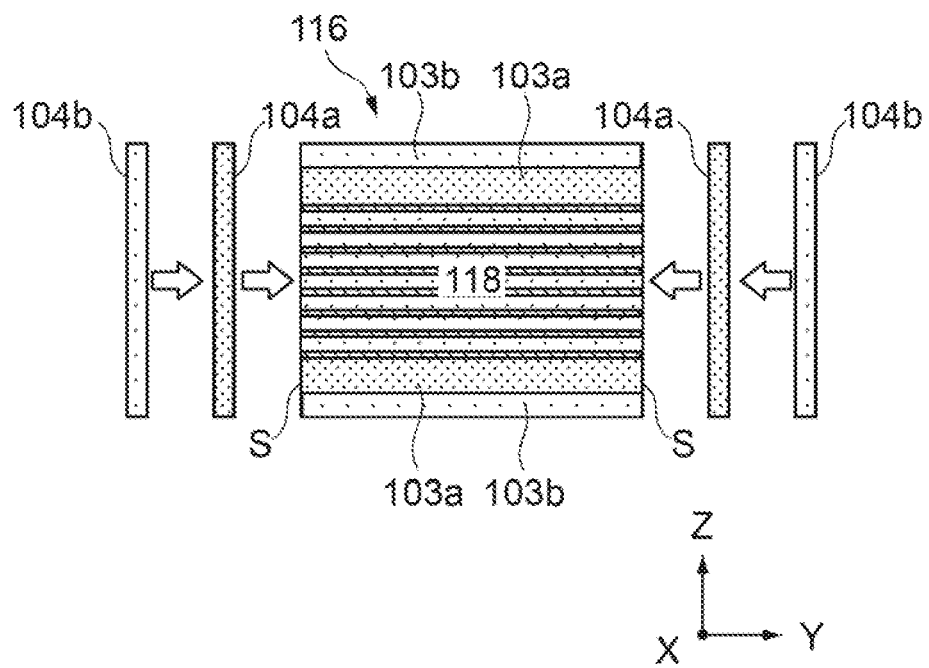
FIGS. 14A and 14B are cross-sectional views showing an another configuration example of the process of forming side margins in the production method 1.

In the configuration example 3, as shown in FIG. 14A, ceramic sheets 103a, to which a glass component is added and which correspond to the second inner layers 119a, and ceramic sheets 103b, to which a glass component is not added and which correspond to the second outer layers 119b, are used as the third ceramic sheets 103 that form the covers 119.

Figure 14B:
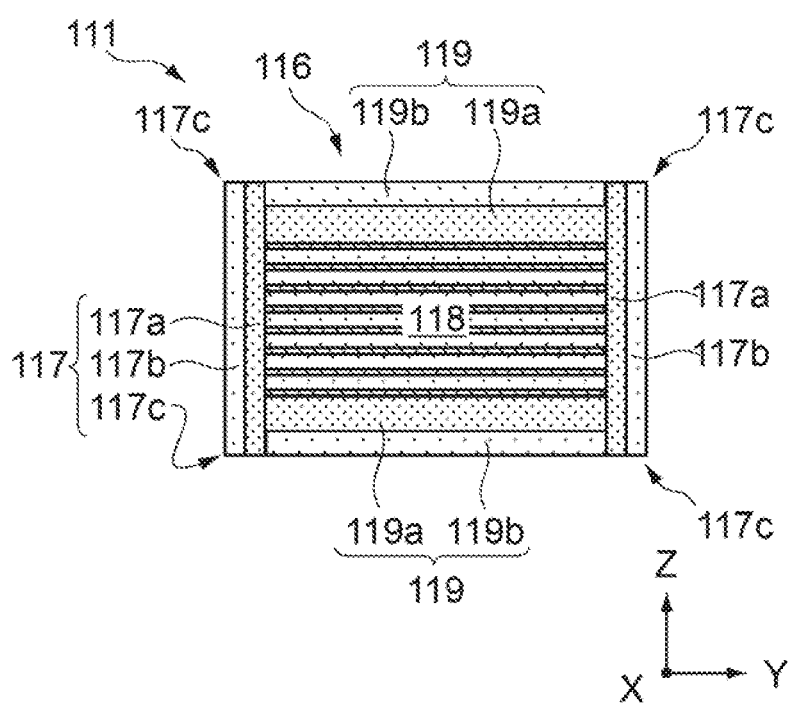

Subsequently, the fourth ceramic sheets 104a corresponding to the first inner layers 17a are attached to the side surfaces S of the multi-layer unit 116, and thereto, the fifth ceramic sheets 104b corresponding to the first outer layers 17b including the ridges 17c are attached. With this configuration, an unsintered ceramic body 111 according to the configuration example 3 shown in FIG. 14B is obtained.

2.1.6 Step S05: Sintering

In Step S05, the ceramic body 111 shown in FIG. 11, which is obtained in Step S04, is sintered to produce the ceramic body 11 of the multi-layer ceramic capacitor 10 shown in FIGS. 1 to 3. In other words, through Step S05, the multi-layer unit 116 becomes the multi-layer unit 16, and the side margins 117 become the side margins 17.

A sintering temperature in Step S05 can be determined on the basis of a sintering temperature for the ceramic body 111. For example, if a barium titanate ($BaTiO_3$) based material is used, the sintering temperature can be set to approximately 1,000 to 1,300° C. Further, sintering can be performed in a reduction atmosphere or a low-oxygen partial pressure atmosphere, for example.

In the ceramic body 111 in the process of sintering, sintering is accelerated in the capacitance forming unit 118 in which the first and second internal electrodes 112 and 113 having a low sintering temperature are disposed. Meanwhile, in each of the configuration examples 1 to 3, in the ceramic body 111 in the process of sintering, sintering is accelerated also in the first inner layer 117a of the side margin 117 in which the liquid phase of the glass component is generated.

Thus, in the ceramic body 111 in the process of sintering, the mismatching in sintering behavior between the capacitance forming unit 118 and the first inner layer 117a of the side margin 117, which have high sinterability, is less likely to occur. Therefore, high adhesiveness of the side margin 17 to the capacitance forming unit 18 can be ensured in the multi-layer ceramic capacitor 10.

Further, similarly, in each of the configuration examples 1 to 3, in the ceramic body 111 in the process of sintering, sintering is accelerated in a portion adjacent to at least the capacitance forming unit 118 in the cover 119 due to the generation of the liquid phase of the glass component. Thus, in the multi-layer ceramic capacitor 10, high adhesiveness of the covers 19 to the capacitance forming unit 18 can be ensured.

2.1.7 Step S06: Formation of External Electrode

In Step S06, the first external electrode 14 and the second external electrode 15 are formed in both the end portions of the ceramic body 11 in the X-axis direction obtained in Step S05, to complete the multi-layer ceramic capacitor 10 shown in FIGS. 1 to 3. The method of forming the first external electrode 14 and the second external electrode 15 in Step S06 is optionally selectable from publicly known methods.

2.2 Production Method 2

In the production method 2 for the multi-layer ceramic capacitor 10 according to this embodiment, the configurations shown in Step S04 and Step S05 are different from those in the production method 1, and configurations of the other steps are common to those in the production method 1. In the production method 2, in order to form the side margins 117, only the fourth ceramic sheets 104a are used, and the fifth ceramic sheets 104b are not used.

Figure 15A:
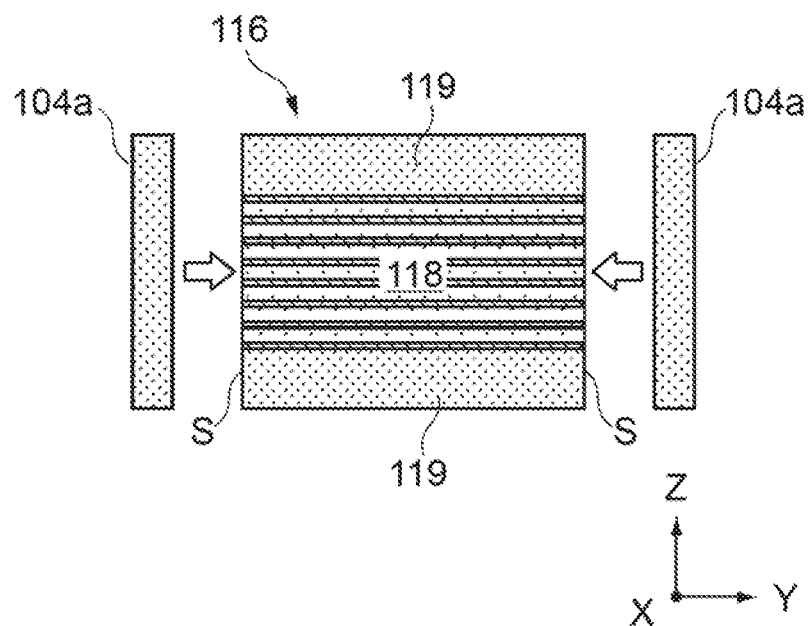
FIGS. 15A and 15B are cross-sectional views showing the process of forming side margins in a production method 2 for the multi-layer ceramic capacitor.
Figure 15B:
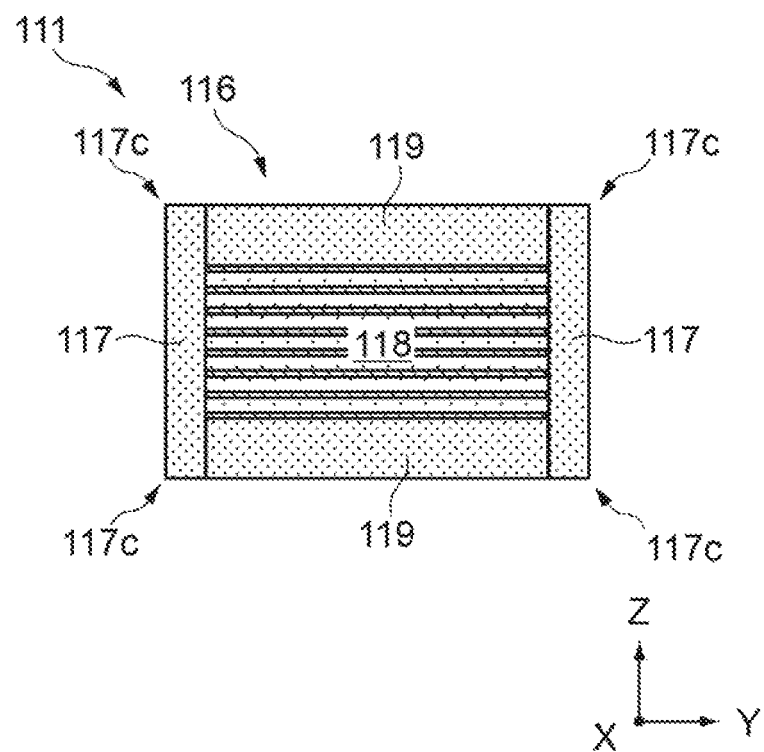

FIGS. 15A and 15B are cross-sectional views showing Step S04 of the production method 2. As shown in FIG. 15A, the fourth ceramic sheets 104a are attached to the side surfaces S of the multi-layer unit 116. It should be noted that a single fourth ceramic sheet 104a or a laminate of a plurality of fourth ceramic sheets 104a may be used for the fourth ceramic sheet 104a. With this configuration, an unsintered ceramic body 111 shown in FIG. 15B is obtained.

In the production method 2, the sintering of the ceramic body 111 in Step S05 is performed in a reduction atmosphere. In the ceramic body 111 in the process of sintering, sintering is accelerated in a surface layer portion that comes into contact with a reducing gas. Thus, in the ceramic body 111 in the process of sintering, the glass component that is present as a liquid phase in the surface layer portion is discharged to the inside along with the crystal growth in the surface layer portion.

In Step S05 of the production method 2, sinterability in the surface layer portion of the ceramic body 111 can be provided with a distribution depending on sintering conditions. For example, providing a strong reducing atmosphere can selectively improve the sinterability of the ridges 117c that come into contact with the reducing gas from two directions along the Y axis and the Z axis.

Thus, for example, employing the sintering conditions in which the atmosphere has strong reducibility and a sintering time is short can reduce the concentration of the glass component in only the ridges 17c in the surface layer portion of the ceramic body 11. With this configuration, only the ridges 17c become the second regions, and the ceramic body 11 according to the configuration example 1 shown in FIG. 3 is obtained.

Further, to the contrary, employing the sintering conditions in which the atmosphere has weak reducibility and a sintering time is long can reduce the concentration of the glass component in the entire region of the surface layer portion of the ceramic body 11. This provides a ceramic body 11 in which the entire surface layer portion shown in FIG. 16 constitutes the second region having a low concentration of the glass component.

Figure 16:
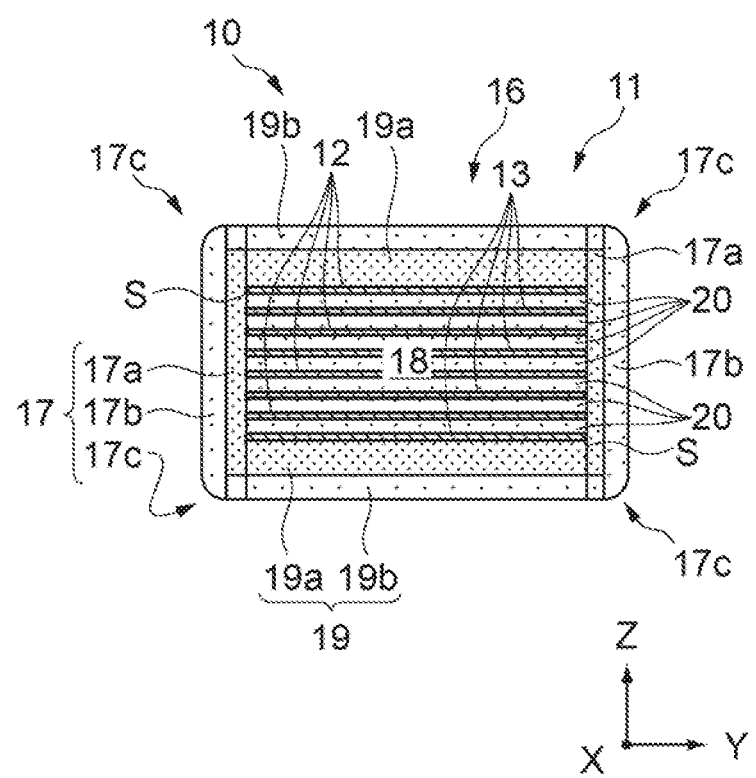
FIG. 16 is a cross-sectional view showing an example of a multi-layer ceramic capacitor obtained by the production method 2.

In the multi-layer ceramic capacitor 10 shown in FIG. 16, the entire region of the outer surface of the ceramic body 11, which is not covered with the first and second external electrodes 14 and 15, is the second region. This provides a multi-layer ceramic capacitor 10 capable of suppressing the occurrence of cracks that reach the first and second internal electrodes 12 and 13 from the outer surface in the entire ceramic body 11.

3. Example and Comparative Examples

For each of Example and Comparative examples 1 and 2 of the embodiment described above, 2,000 samples of the multi-layer ceramic capacitors having common configurations excluding the side margins were produced. Samples according to Example each have a configuration similar to the configuration example 1 shown in FIG. 3. Samples according to Comparative examples 1 and 2 have configurations different from the configuration example 1 shown in FIG. 3 in the configuration of the side margins.

Specifically, in the samples according to Comparative example 1, the entire side margin constitutes the first region, that is, the glass phase is deposited in the crystal grain boundary over the entire side margin. In the samples according to Comparative example 2, the entire side margin constitutes the second region, that is, the glass phase is not substantially deposited in the crystal grain boundary over the entire side margin.

A moisture resistance test was performed for the 1,000 samples of each of Example and Comparative examples 1 and 2. In the moisture resistance test, the samples were held for 1,000 hours at a temperature of 85° C. and a humidity of 85% under application of a rated voltage of 4 V. Subsequently, the samples whose electric resistance value was smaller than 1 MΩ after the moisture resistance test were determined as defectives due to an insulation failure.

As a result, no defectives were found in any of the samples according to Example and Comparative example 1. On the other hand, defectives were found in three samples according to Comparative example 2. Consequently, it was determined that the moisture resistance is improved by forming the first inner layer, which is adjacent to the side surfaces of the multi-layer unit, to be the first region.

Next, an impact resistance test was performed for the 1,000 samples of each of Example and Comparative examples 1 and 2. In the impact resistance test, each sample was dropped on a desk from a height of 30 cm. Subsequently, visual inspection was performed on the dropped samples, and samples with cracks were determined as defectives due to insufficient impact resistance.

As a result, no defectives were found in any of the samples according to Example and Comparative example 2. On the other hand, defectives were found in two samples according to Comparative example 1. Consequently, it was determined that the impact resistance is improved by forming the ridges of the side margins to be the second regions.

4. Other Embodiments

While the embodiment of the present disclosure has been described, the present disclosure is not limited to the embodiment described above, and it should be appreciated that the present disclosure may be variously modified.

For example, the present disclosure is applicable to not only the multi-layer ceramic capacitor but also a general multi-layer ceramic electronic component including a functional unit in which a plurality of internal electrodes are laminated. Examples of the multi-layer ceramic electronic component to which the present disclosure is applicable include a chip varistor, a chip thermistor, and a multi-layer inductor, in addition to the multi-layer ceramic capacitor.

What is claimed is:

1. A multi-layer ceramic electronic component, comprising:
 (a) a ceramic body including:
  (i) a multi-layer unit having:
   a side surface facing in a direction of a first axis and including a functional unit, said functional unit including internal electrodes that are laminated in a direction of a second axis orthogonal to the first axis and have respective end portions positioned on the side surface, and
   a cover facing and covering the functional unit in the direction of the second axis and including a first region which is defined as a region containing a first concentration of a glass component; and
  (ii) a side margin including:
   a first inner layer positioned adjacent to the side surface of the multi-layer unit and including the first region contacting the first region of the cover,
   a first outer layer positioned outside of the first inner layer, and
   a ridge positioned at an end portion of the first outer layer in the direction of the second axis and including a second region which is defined as a region containing a second concentration of the glass component which is lower than the first concentration of the glass component of the first region,
  wherein the side margin has a dimension of 13 µm or less in the direction of the first axis; and
 (b) an external electrode that covers the ceramic body from a direction of a third axis orthogonal to the first axis and the second axis.

2. The multi-layer ceramic electronic component according to claim 1, wherein
 the first outer layer of the side margin includes the second region.

3. The multi-layer ceramic electronic component according to claim 1, wherein
 the cover includes:
 a second inner layer adjacent to the functional unit and including the first region; and
 a second outer layer positioned outside of the second inner layer and including the second region.

4. The multi-layer ceramic electronic component according to claim 3, wherein
 an entire region, of an outer surface of the ceramic body, which is not covered with the external electrode, includes the second region.

5. The multi-layer ceramic electronic component according to claim 1, wherein
 the functional unit includes ceramic layers positioned between the internal electrodes and including the second region.

* * * * *